(12) United States Patent
Mathew et al.

(10) Patent No.: US 7,953,633 B2
(45) Date of Patent: May 31, 2011

(54) TOUCHLESS AND TOUCH OPTIMIZED PROCESSING OF RETAIL AND OTHER COMMERCE TRANSACTIONS

(75) Inventors: Ashvin Mathew, Kirkland, WA (US); Derrick Steven Bazlen, Woodinville, WA (US); Jeffrey Blucher, Redmond, WA (US); Sylvester M. LaBlanc, Issaquah, WA (US); Andreas Hoffmann, North Bend, WA (US); Gregg Robert Dingle, Mill Creek, WA (US); Brendan O'Meara, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 955 days.

(21) Appl. No.: 11/097,353

(22) Filed: Apr. 1, 2005

(65) Prior Publication Data

US 2006/0224429 A1    Oct. 5, 2006

(51) Int. Cl.
*G06Q 20/00* (2006.01)
*G05B 19/418* (2006.01)
*G06F 9/46* (2006.01)
*G06F 15/02* (2006.01)

(52) U.S. Cl. .................................. 705/16; 705/8; 705/9
(58) Field of Classification Search .................... 705/16, 705/8, 9
See application file for complete search history.

(56) References Cited

U.S. PATENT DOCUMENTS

| 5,602,377 A * | 2/1997 | Beller et al. ............. 235/462.15 |
| 6,179,206 B1 * | 1/2001 | Matsumori .................... 235/383 |
| 6,263,383 B1 | 7/2001 | Lee et al. ......................... 710/38 |
| 6,431,444 B1 * | 8/2002 | Gatto ............................. 235/380 |
| 7,171,400 B2 * | 1/2007 | Koubenski et al. ............... 707/3 |
| 2001/0051876 A1 * | 12/2001 | Seigel et al. ...................... 705/1 |
| 2003/0083965 A1 * | 5/2003 | Taylor ............................. 705/31 |
| 2007/0027732 A1 * | 2/2007 | Hudgens .......................... 705/7 |

OTHER PUBLICATIONS

Skydel, Seth, Short range—long value; RFID: Radio Frequency Identfication—technology applications offer benefits to transportation and mobile workface operation. Transport Technology Today. Apr. 2002, p. 10 (8).*

* cited by examiner

*Primary Examiner* — Matthew S Gart
*Assistant Examiner* — Scott A Zare
(74) *Attorney, Agent, or Firm* — Joseph R. Kelly; Westman, Champlin & Kelly, P.A.

(57) ABSTRACT

A computer implemented method for reducing input performed in a commerce based application is provided. The method includes receiving a sequence of input values from an input device and associating the sequence of input values with an object in the application based on the sequence. A context of the application is determined. One or more tasks in the application are automatically performed based on the object, the context and the sequence of input values.

20 Claims, 9 Drawing Sheets

| MICROSOFT RETAIL MANAGEMENT SYSTEM - POINT OF SALE | ☒ |
|---|---|

| SALES | | | | | | COMMON TASKS |
|---|---|---|---|---|---|---|
| WED, NOV. 24, 2004 | | | | | | CUSTOMERS BY LAST NAME |
| ITEM NO. | DESCRIPTION | QTY. | PRICE | TAX | EXTENDED PRICE | ITEMS BY DESCRIPTION |
| 25000-10202 | PAJAMAS SMALL... | 1 | $12.99 | - | $12.99 | DISCOUNT TRANSACTION |
| REMOVE | VIEW/EDIT | EDIT QTY. | DISCOUNT | | | HOLD RECALL |
| | | | | | | DROP/PAYOUT |
| TENDERED | | $0.00 | SUBTOTAL | | $12.99 | NEW CUSTOMER |
| | | | TAX | | $1.09 | |
| TOTAL DUE | | $14.08 | TOTAL | | $14.08 | TIME CLOCK |
| SELECT A CUSTOMER | | | SHIPPING ADDRESS | | | CANCEL TRANSACTION |
| ADD CUSTOMER | | | | | | |

| HELP F1 | ITEMS F2 | CUSTOMER F3 | TRANSACTION F5 | TASKS F6 | TOOLS F7 | RETURN F8 | TENDER F12 |

FIG. 5

| MICROSOFT RETAIL MANAGEMENT SYSTEM - POINT OF SALE | ☒ |
|---|---|

| SALES | COMMON TASKS |
|---|---|
| WED, NOV. 24, 2004 | CUSTOMERS BY LAST NAME |

| ITEM NO. | DESCRIPTION | QTY. | PRICE | TAX | EXTENDED PRICE |
|---|---|---|---|---|---|
| 25000-10202 | PAJAMAS SMALL... | 1 | $12.99 | - | $12.99 |

REMOVE | VIEW/EDIT | EDIT QTY. | DISCOUNT

Common Tasks (right column):
- CUSTOMERS BY LAST NAME
- ITEMS BY DESCRIPTION
- DISCOUNT TRANSACTION
- HOLD RECALL
- DROP/PAYOUT
- NEW CUSTOMER
- TIME CLOCK
- CANCEL TRANSACTION

| TENDERED | $0.00 | | SUBTOTAL | $12.99 |
|---|---|---|---|---|
| | | | TAX | $1.09 |
| TOTAL DUE | $14.08 | | TOTAL | $14.08 |

PURCHASE HISTORY

GREGORY WEBER
9392 NINTH AVE.
REDMOND, WA 93893
(425) 555-0129

SHIPPING ADDRESS
GREGORY WEBER
9392 NINTH AVE.
REDMOND, WA 93893

| HELP F1 | ITEMS F2 | CUSTOMER F3 | TRANSACTION F5 | TASKS F6 | TOOLS F7 | RETURN F8 | TENDER F12 |

FIG. 6

| MICROSOFT RETAIL MANAGEMENT SYSTEM - POINT OF SALE | ☒ |
|---|---|

| SALES | COMMON TASKS |
|---|---|

WED, NOV. 24, 2004

| ITEM NO. | DESCRIPTION | QTY. | PRICE | TAX | EXTENDED PRICE |
|---|---|---|---|---|---|
| 25000-10202 | PATAMAS | | | | $12.99 |

REMOVE

POST TRANSACTION ☒

STATUS:

TRANSACTION COMPLETED.

CHANGE:

CASH $0.00

CLOSE

| TENDERED | $12.99 |
| | $1.09 |
| TOTAL DUE | $14.08 |

PURCHASE HISTORY

GREGORY WEBER
9392 NINTH AVE.
REDMOND, WA 93893
(425) 555-0129

SHIPPING ADDRESS
GREGORY WEBER
9392 NINTH AVE.
REDMOND, WA 93893

COMMON TASKS:
- CUSTOMERS BY LAST NAME
- ITEMS BY DESCRIPTION
- DISCOUNT TRANSACTION
- HOLD RECALL
- DROP/PAYOUT
- NEW CUSTOMER
- TIME CLOCK
- CANCEL TRANSACTION

| HELP F1 | ITEMS F2 | CUSTOMER F3 | TRANSACTION F5 | TASKS F6 | TOOLS F7 | RETURN F8 | TENDER F12 |

FIG. 7

TOUCHLESS AND TOUCH OPTIMIZED PROCESSING OF RETAIL AND OTHER COMMERCE TRANSACTIONS

BACKGROUND OF THE INVENTION

The present invention relates to processing data from an input device. In particular, the present invention relates to performing tasks in a commerce application based on input data.

There are a number of different input devices that communicate with a computer. For example, retail input devices can include a keyboard for manual input, a barcode scanner for scanning barcodes and a magnetic stripe reader for reading a magnetic stripe on a credit card. Additionally, pointer devices, touch screens and other devices can be used. A commerce based application such as a retail software application running on the computer uses input data from these devices for a number of different tasks, for example to process a transaction.

Typically, software applications require a prompt or other indication of a particular input that the software application can expect. This prompting requires additional tasks to be performed by a user. Typically, the prompting is provided by a form of "touch" input device, where a user has to physically touch the device, such as a mouse, keyboard or touch screen. These additional input operations lead to increased time in processing a transaction, mistakes and training costs. For example, in a simple one-item transaction, a user will need to prompt the application to expect input related to one or more items for purchase, expect input related to customer information and expect input related to a tender used for the transaction. Thus, there is a need to provide an efficient manner for performing tasks based on input from an input device.

SUMMARY OF THE INVENTION

A computer implemented method for reducing input performed in a commerce based application is provided. The method includes receiving a sequence of input values from an input device and associating the sequence of input values with an object in the application based on the sequence. A context of the application is determined. One or more tasks in the application are automatically performed based on the object, the context and the sequence of input values.

Another aspect of the present invention relates to a commerce based system having a computer with memory and at least one input port. A plurality of input devices are operably coupled to the at least one input port to send a sequence of input values to the input port. A commerce based application program is stored on the memory and operably coupled to the at least one input port to receive a particular sequence of input values from one of the plurality of input devices. The application program includes an application context module defining a context of the application program and a transaction processing module operably coupled to the application context module. The transaction processing module is adapted to receive the particular sequence, associate the particular sequence with an object based on the sequence and perform one or more tasks based on the object, the particular sequence and the context of the application program.

BRIEF DESCRIPTION OF THE DRAWINGS

FIGS. 5-9 are screen shots of a retail application that illustrates tasks performed based on input from an input device.

DETAILED DESCRIPTION OF THE PREFERRED EMBODIMENTS

Figure 1:
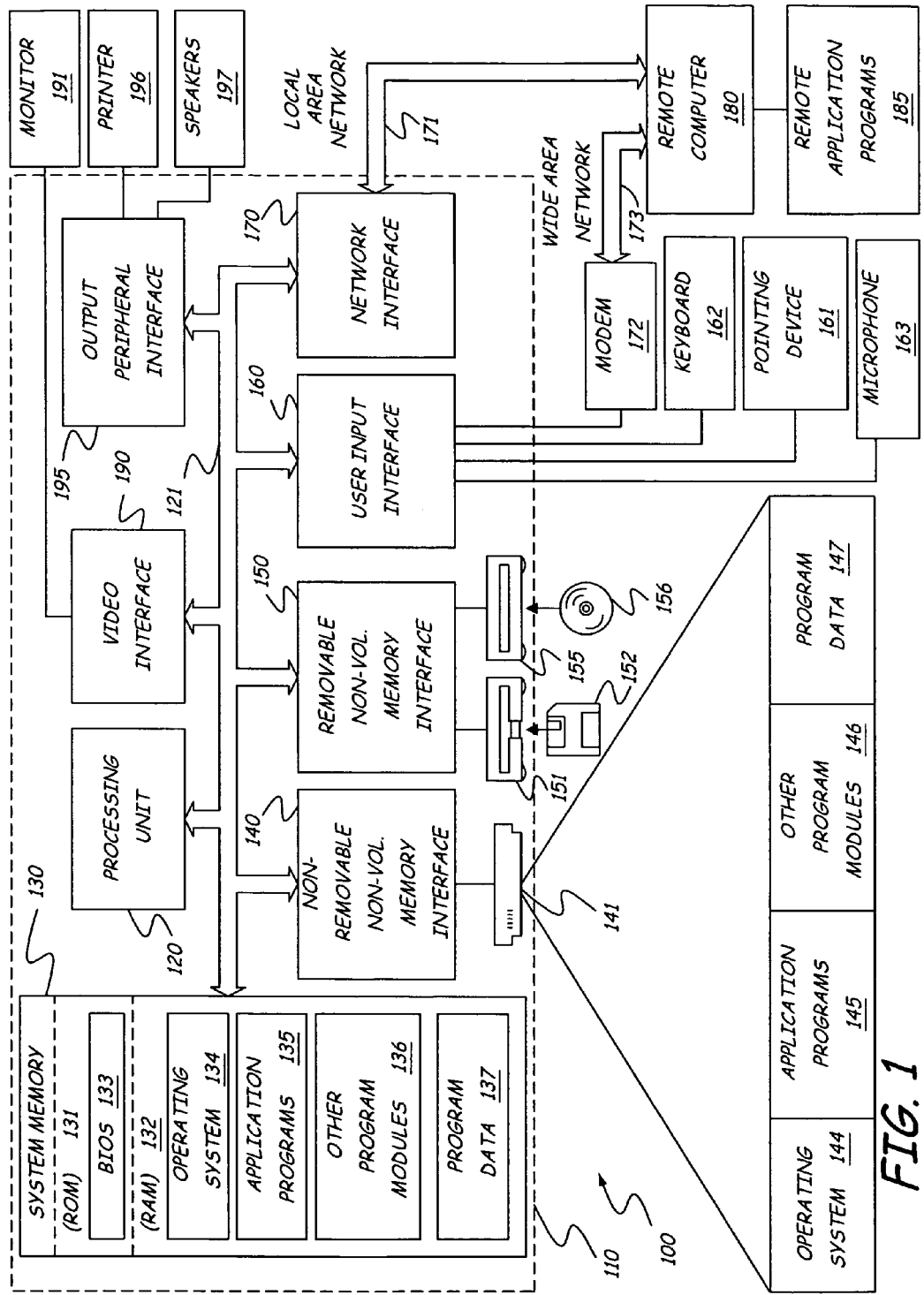
FIG. 1 is a block diagram of a general computing environment in which the present invention can be useful.

Prior to discussing the present invention in greater detail, one embodiment of an illustrative environment which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available medium or media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
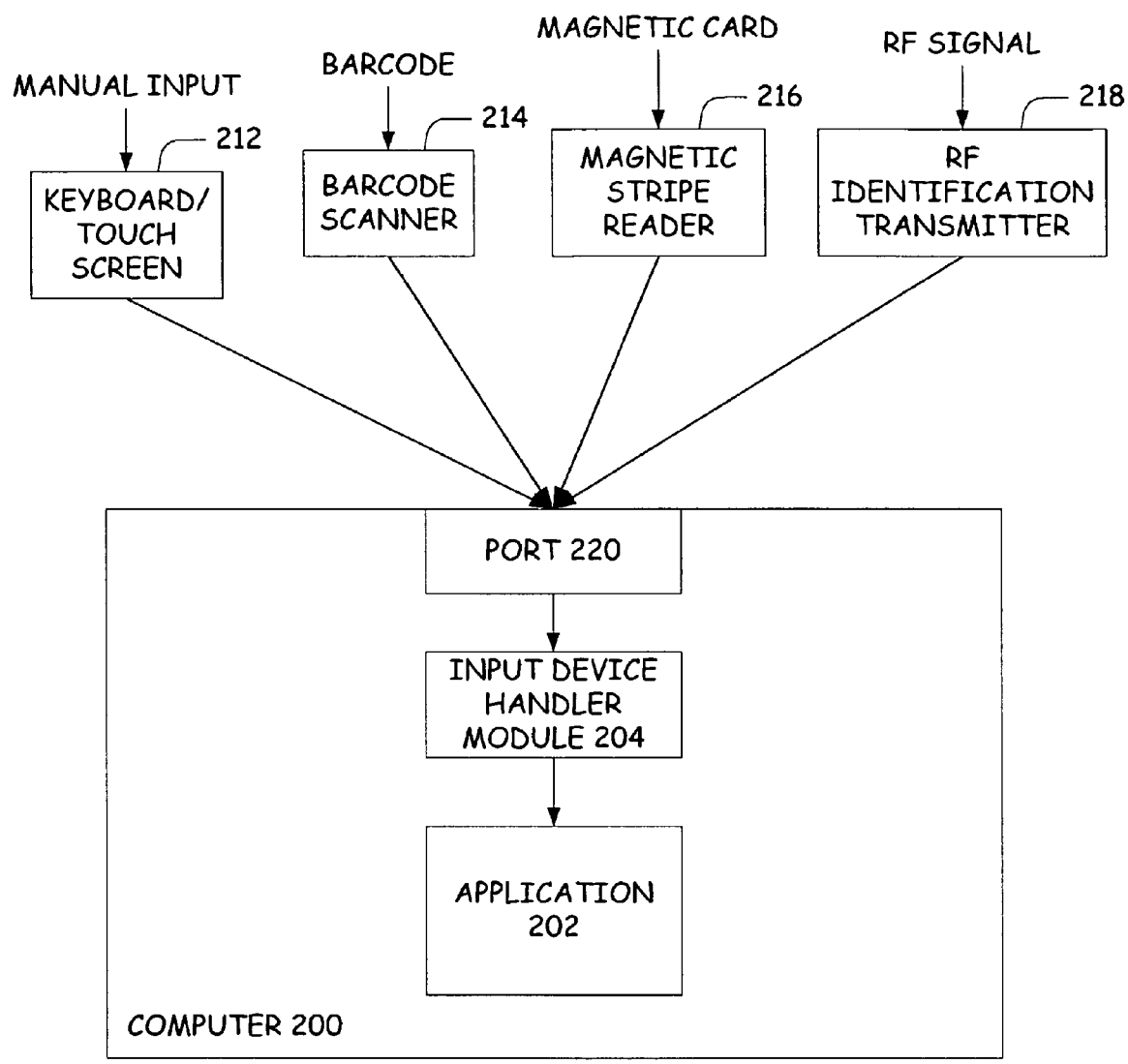
FIG. 2 is a block diagram of a plurality of input devices providing input to a computer.

FIG. 2 illustrates an environment wherein a plurality of input devices communicate with a computer 200, an example of which is described above with respect to FIG. 1. Computer 200 includes at least one application 202 and an input device handler 204. A plurality of input devices including a keyboard and/or a touch screen 212, a barcode scanner 214, a magnetic stripe reader 216 and a RF identification receiver 218 communicate through at least one port 220 to computer 200. As appreciated by those skilled in the art, other input devices, such as a magnetic ink character recognition (MICR) reader, may also be used in accordance with the present invention and multiple input devices can share a common form factor and/or input conduit.

Keyboard/touch screen 212 receives manual input from a user, barcode scanner 214 scans a barcode, magnetic stripe reader 216 reads a magnetic stripe of a magnetic card and RF identification receiver 218 receives radio frequency signals that are sent to port 220. In accordance with the present invention, multiple ports similar to port 220 that are operably coupled to separate input devices can also be used. Each of the multiple ports can provide information received from a respective input device to input device handler module 204.

Input device handler 204 receives input from the plurality of devices through at least one port 220 and sends the input to application 202. In an exemplary embodiment, the input includes a sequence of input values that relate to various information, such as a customer name, a product identification number and a credit card account number. Application 202 detects the input and automatically performs tasks based on the input. The tasks are also based on a particular context for the application. In accordance with an embodiment of the present invention, using application 200, the need for use of keyboard/touch screen 212 can be reduced and in some cases eliminated during processing of a transaction. For example, a cashier need only use a scan, scan and swipe to completely process a transaction. Thus, operation of other input devices that use touching is minimized.

Figure 3:
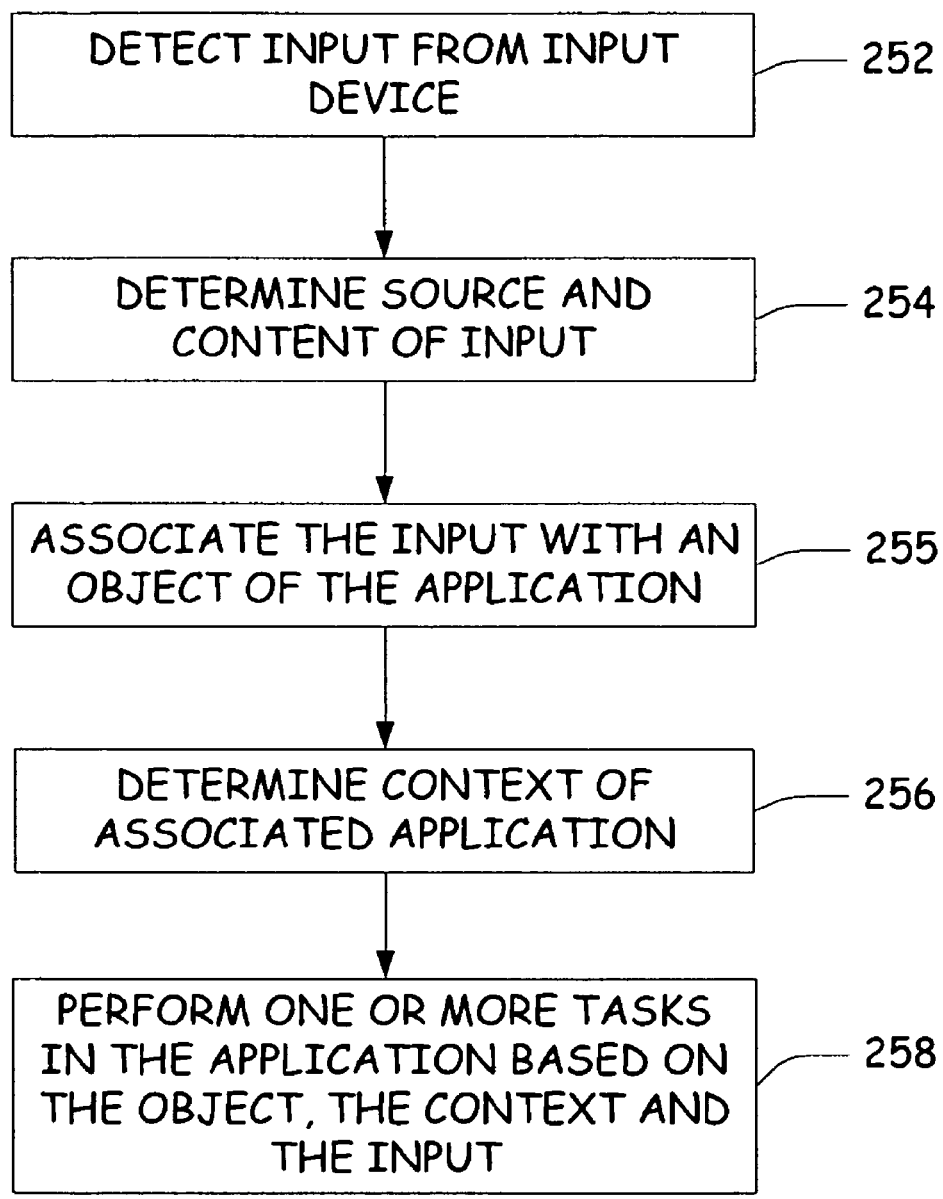
FIG. 3 is a flow diagram of a method for processing input from an input device.

FIG. 3 is an exemplary method for processing input from an input device in a commerce application. As discussed below, the input is processed based on program heuristics to predict a logical flow for the input. At step 252, input from the input device is detected. For example, input device handler 204 can detect input from any of the input devices described above. At step 254 a source and content of the input is determined. In one embodiment, the source and content of the input can be determined in a manner described in U.S. application Ser. No. 10/740,936, filed Dec. 19, 2003, entitled AUTOMATED INPUT DETERMINATION, the contents of which are hereby incorporated by reference in its entirety. For example, if a sequence of sixteen input values is received, the sequence can indicate that a magnetic stripe reader provided the input. Other methods of determining the source and content can be used. The sequence is associated with an object in the application based on the content and/or the source of the sequence at step 255. Exemplary objects for a commerce application include a retail item, a customer, a tender, an order a shipping notice, etc. The context of an associated application is determined at step 256. The context can be related to one or more aspects of the application, for example a particular mode for the application, a location, a user, etc.

At step 258, one or more tasks (or actions) are automatically performed based on the object, the context and the input. For example, these tasks can include a comparison of the input with an inventory list, a customer list and/or a receipt list. Further tasks can additionally be performed, such as calculation of sales tax, requesting approval for a credit card transaction and/or presenting multiple options to a user. In some instances, the context of the application is switched based on the input. For example, the context can be switched from an initial mode to a sales transaction made or a return void mode. The tasks that are performed are determined from heuristics based on a logical flow for the application based on the input.

Figure 4:
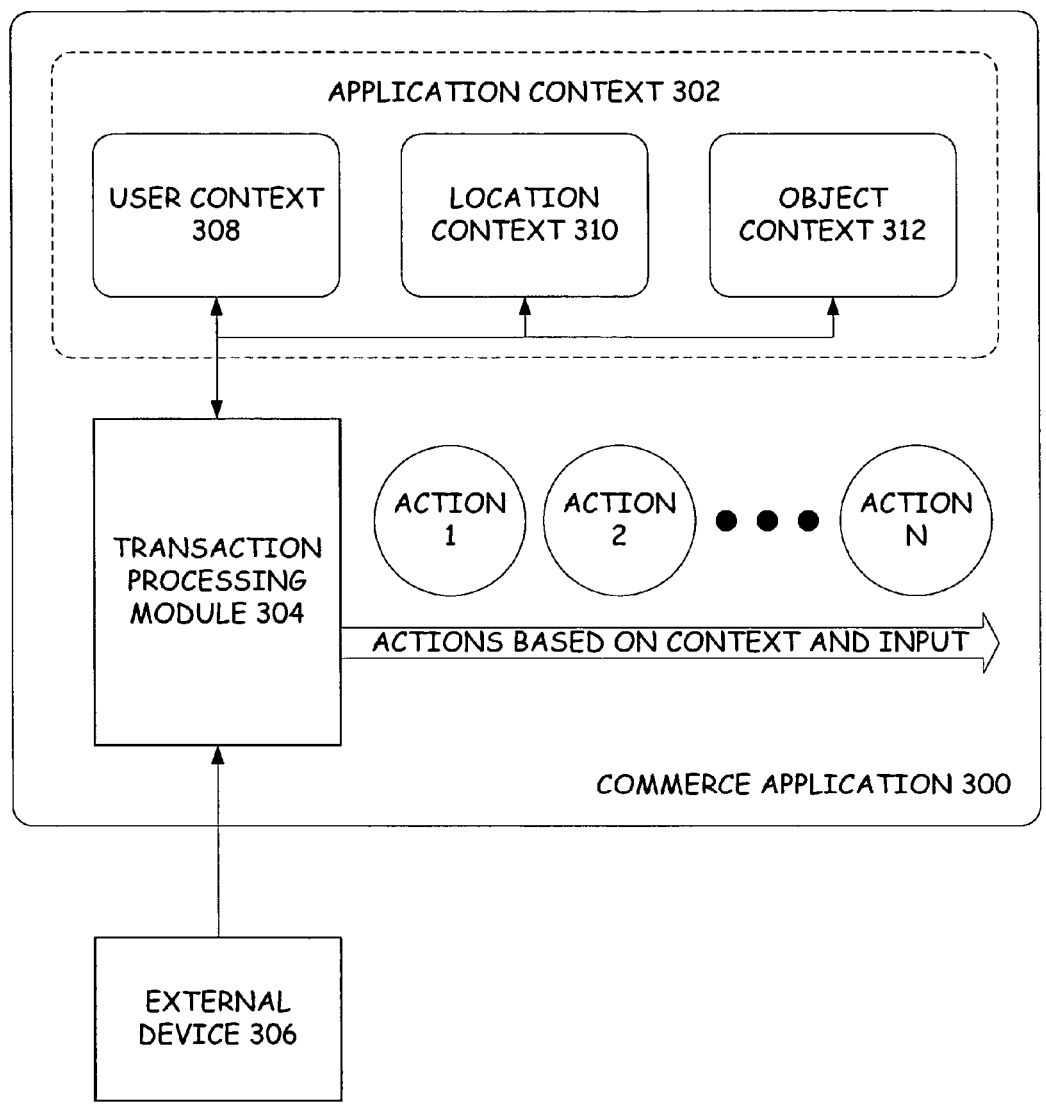
FIG. 4 is a block diagram of a retail application that receives input from an external device.

FIG. 4 is a block diagram of an exemplary commerce application 300 for use with the present invention. Commerce application 300 includes an application context 302 and a transaction processing module 304. An external device 306, which can be any of the input devices discussed above, provides input to application 300, which is then sent to transaction processing module 304.

Transaction module 304 is based on program heuristics designed to reduce, and in some cases eliminate, input from a user of devices such as a mouse and/or a keyboard. Based on the input of external device 306, transaction processing module 304 associates the input with an object and utilizes a plurality of actions, herein shown as actions 1-N, depending on application context 302. The object can be an object as discussed above. Application context 302 includes a user context 308, location context 310 and object context 312. Other context associated with application context 302 can also be used.

User context 308 includes default behavior actions based on a particular user for application 300. For example, the user may be an owner, a manager, a cashier, etc. Each of these user contexts can have varying attributes, roles and permissions. For example, retail application 300 can be designed such that only a manager or owner can void a transaction. Location context 310 is based on the location of retail application 300. For example, the location could be at a point of sale, a back office setting, a warehouse, etc. Location context 310 thus includes default behavior actions based on the location. In a point of sale context, scanning an item can populate a retail transaction with the item's details. Object context 312 identifies various objects, such as items, customers, tenders, transactions, receipts, etc. Transaction module 304 associates the input with one or more of these objects. Object context 312 includes default behavior actions based on user context 308, location context 310 and the one or more objects.

Given the application context 302, which includes user context 308, location context 310 and object context 312, transaction processing module 304 selects one or more actions based on the context and the input from external device 306. For example, one action can be related to adding a customer to a transaction based on a customer scan of a customer ID card. Another action can be related to adding an item to a transaction based on a bar code scan of an item's bar code. Yet another action can be based on tendering an amount to a credit card based on a card swipe from a magnetic stripe reader.

Thus, in a store or other environment having bar coded inventory with customer cards and electronic credit or debit processing, a sales cashier can complete a sales transaction without accessing input devices such as keyboards, pointer devices and/or touch panels. Instead, a transaction is completed with only a scan of an item, a scan of a customer card and a swipe of the credit card. The transaction processing module 204, based on heuristics, compares the first scan to an inventory list and adds an item to the transaction, the second scan adds a customer to the transaction and the credit card swipe tenders the credit card to the transaction and prints out a receipt.

FIGS. 5-9 are exemplary screen shots that illustrate tasks performed by a retail application based on input from an input device and a context of the retail application. The retail application is at a point of sale location. Heuristics can help to predict a logical flow for the retail application based on the input. For example, if a credit card is swiped after items are entered in a transaction, the credit card is most likely the tender for the transaction. It will be appreciated that the present invention can be implemented in other environments and/or locations, for example in back office settings and shipping warehouses.

FIGS. 5-7 are screen shots for a single sales transaction. In FIG. 5, a user has scanned a bar code for an item. Input can also be provided from an RF identification receiver. The retail application determines the source and the content of the input as discussed above. Based on the source and content of the input, the input is associated with one or more objects. The input here is associated with an inventory item. A context of the retail application is also determined. In this case, the context is an initial mode. Based on the one or more objects, the context and the input, tasks are performed in the retail application. For the bar code scan, a comparison of the input is made with inventory data, a customer list and/or a receipt list. As shown in FIG. 5, the retail application has located and matched the input with item number 25000-010202. This item, along with any other information, is automatically added to a sales transaction and a subtotal and tax for the transaction are calculated. Furthermore the context of the retail application is updated to a sales transaction mode. In the sales transaction mode, further items that are scanned are automatically added to the transaction.

FIG. 6 is a screen shot wherein a customer barcode has been scanned. The input is detected and associated with one or more objects. The context of the application, herein the sales transaction mode, is also determined. In this case, the input is compared to a database and matches a customer's information. This customer information is automatically added to the transaction. In FIG. 7, a user has swiped a credit card using a magnetic stripe reader. The credit card information is associated with a tender for the application. Since the retail application is still in the sales transaction mode, the tasks to be performed include posting the transaction, tendering a sale amount to the credit card, printing a sales receipt and opening a cash drawer. As a result, a full transaction can be processed in the application using only the bar code scanner and the magnetic stripe reader. A user has only needed to scan an item, scan a customer card and swipe a credit card. Thus, no manual input, for example, using a keyboard, pointer device and/or a touch panel is necessary from the user.

Figure 8:
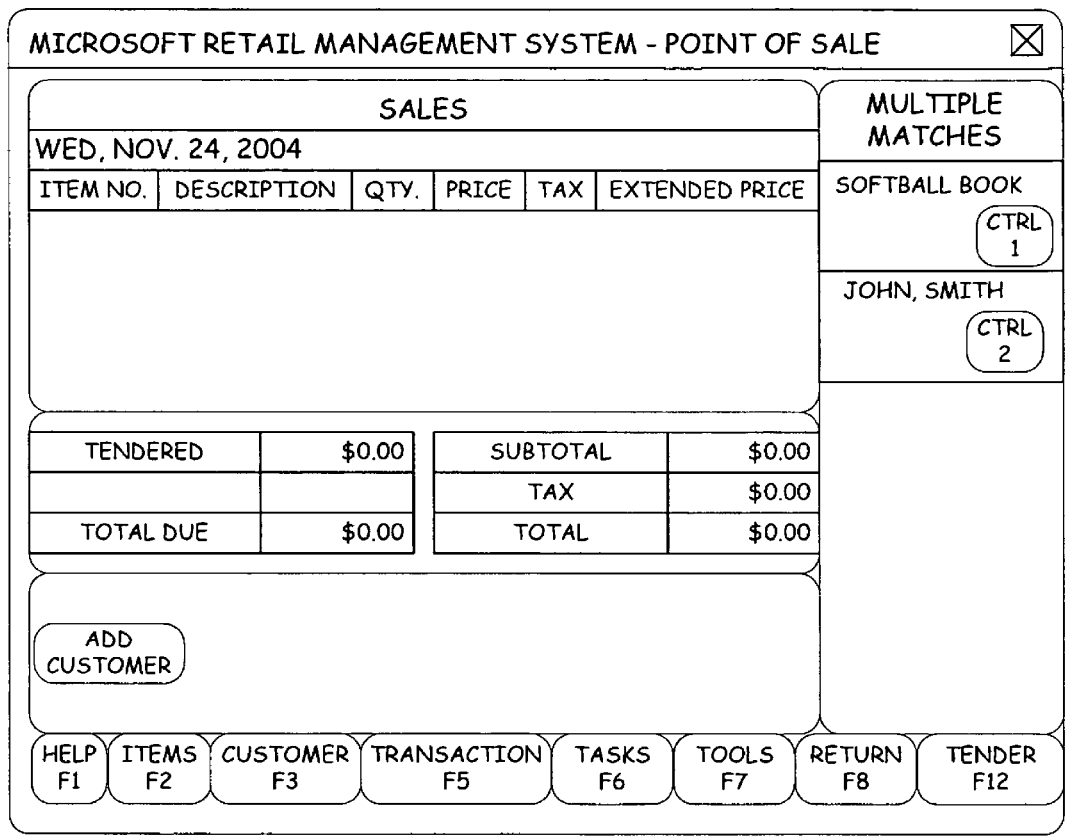

FIG. 8 is a screen shot for processing input in a retail application. In this case, a user has scanned an item and the input has been detected as well as the context been determined. The input has matched multiple items from a data source associated with the retail application. The input has matched an item (Softball Book) and a customer (John, Smith). Both of these options are presented to the user in order for the user to quickly select either option and continue with the transaction. For example, if the user scanned the item (Softball Book), the user can easily select the softball book to be put into the transaction.

Figure 9:
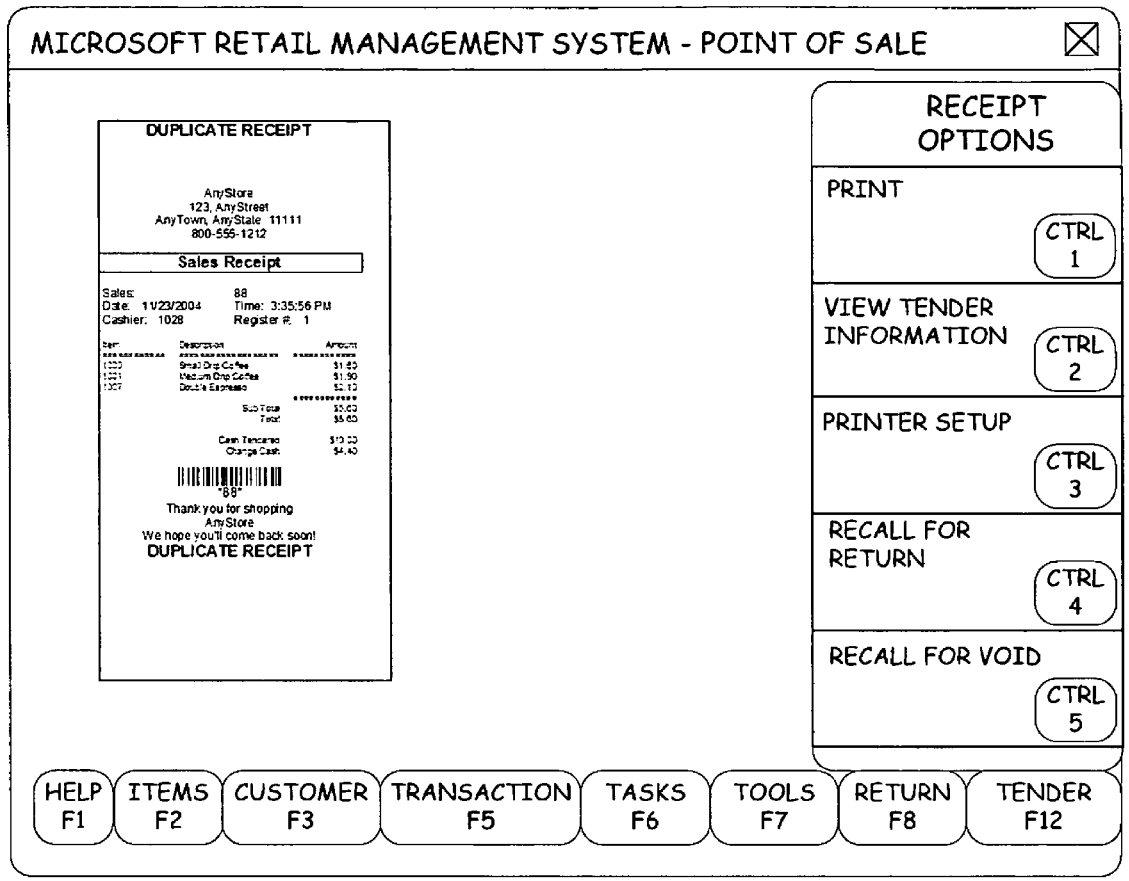

FIG. 9 is a screen shot wherein a user has scanned in a sales receipt, for example by using a bar code scanner. Automatically, the sales receipt appears in a window of the retail application and various options are presented to the user. The retail application is also updated to a return void mode. Accordingly, if sale items are scanned and matched to an item in the sales receipt, a return void transaction will begin.

Using the present invention discussed above, input from an input device can be automatically processed in order to reduce input required by a user. The tasks that are automatically performed by an application can be based on heuristics that predict an intended action of the user. For example, given a retail point of sale context, scanning an item will automatically populate a retail transaction with the item's detail, such as a description, an item number and an amount. Further input can produce additional processing tasks for the retail application. As discussed above, the present invention can also be extended to other inputs, input devices and/or contexts. For example, in a warehouse setting, a scanned item provided from an RF device can automatically enter an application into a shipping mode and print and send a shipping notice.

Although the present invention has been described with reference to preferred embodiments, workers skilled in the art will recognize that changes may be made in form and detail without departing from the spirit and scope of the invention.

What is claimed is:

1. A computer implemented method for reducing input performed in a commerce based application, the method comprising:
   receiving a sequence of input values from a source user input device;
   associating the sequence of input values with an object in the commerce based application based on the sequence of input values and the source user input device from which the sequence of input values is received;
   determining a context of the commerce based application using a computer, wherein the context includes a location context that is based on a particular location in a stream of commerce in which the commerce based application is deployed, the particular location being one of a plurality of different locations in the stream of commerce, wherein the plurality of different locations in the stream of commerce comprise at least one point of sale location in the stream of commerce and at least one non-point of sale location in the stream of commerce, wherein functions performed in the stream of commerce at the at least one point of sale location comprise different types of functions than functions performed in the stream of commerce at the at least one non-point of sale location, the location context including default behavior actions that perform default functions within the stream of commerce at the particular location; and
   automatically performing one or more tasks in the commerce based application based on the object, the context, the source user input device and the sequence of input values.

2. The method of claim 1 and further comprising:
   switching the context of the commerce based application based on the sequence of input values.

3. The method of claim 2 and further comprising:
   receiving a second sequence of input values;
   associating the second sequence of input values with a second object based on the second sequence; and
   automatically performing one or more tasks in the commerce based application based on the second object, the second sequence and the context of the commerce based application.

4. The method of claim 1 wherein the commerce based application is a retail application.

5. The method of claim 4 wherein the object is an item for purchase and the one or more tasks include populating a transaction in the retail application with the item and calculating an amount for the transaction.

6. The method of claim 5 and further comprising:
   receiving a second sequence of input values related to a credit card number; and
   associating the credit card number with a tender object for the transaction.

7. The method of claim 6 and further comprising:
   verifying the credit card number; and
   printing a receipt for the transaction.

8. The method of claim 4 wherein the object is an item and the context is switched to a sales transaction mode.

9. The method of claim 1 wherein the object is a receipt and the context is switched to a return void mode.

10. The method of claim 1 wherein the object includes information related to at least one of an item, a customer identification, a tender, a transaction and a receipt.

11. The method of claim 1 wherein the context relates to at least one of a user, and an object of the application.

12. The method of claim 1 wherein an entire transaction of identifying products to be purchased, identifying a customer, identifying a credit card to be charged, posting a sale, tendering a sale to a credit card, printing a sales receipt and opening a cash drawer is completed within the commerce based application using the sequence of input values, wherein the sequence of input values is received from only input devices comprising a bar code scanner and a magnetic stripe reader.

13. The method of claim 1, wherein the at least one non-point of sale location within the stream of commerce comprises at least one of a back office setting and a warehouse location.

14. A commerce based system comprising:
a computer having memory and at least one input port;
a plurality of user input devices operably coupled to the at least one input port to send a sequence of input values to the input port; and
a commerce based application program stored on the memory and configured to be deployed in a plurality of different locations within a stream of commerce, wherein the plurality of different locations within the stream of commerce comprise at least one non-point of sale location within the stream of commerce, wherein different functions performed within the stream of commerce are performed at each of the plurality of different locations, and the commerce based application being operably coupled to the at least one input port to receive a particular sequence of input values from one of the plurality of user input devices, the commerce based application program including:
an application context module defining a context of the commerce based application program, the context including a location context that is based on a particular location within the stream of commerce in which the application is deployed, the particular location being one of the plurality of different locations within the stream of commerce, the location context including default behavior actions that perform default functions at the location in the stream of commerce;
a transaction processing module operably coupled to the application context module and adapted to receive the particular sequence, associate the particular sequence with an object based on the particular sequence and perform one or more tasks based on the object, the particular sequence and the context of the commerce based application program; and
wherein the plurality of user input devices include a bar code scanner and a magnetic stripe reader and wherein a transaction comprising identifying products to be purchased, identifying a customer, identifying a credit card to be charged, posting a sale, tendering a sale to a credit card, printing a sales receipt and opening a cash drawer is completed within the commerce based application using the sequence of input values, wherein the sequence of input values is received from only input devices comprising a bar code scanner and a magnetic stripe reader.

15. The system of claim 14 wherein the application context module is adapted to switch the context based on the particular sequence.

16. The system of claim 15 wherein the transaction processing module is further adapted to receive a second particular sequence of input values from one of the plurality of input devices, associate the second particular sequence with a second object and automatically perform one or more tasks in the commerce based application program based on the object, the second particular sequence and the context.

17. The system of claim 14 and further comprising a data source operably coupled to the computer and wherein the transaction processing module is adapted to compare the particular sequence to the data source.

18. The system of claim 14 wherein the object is an item for purchase and the transaction processing module is adapted to populate a transaction in the commerce based application program with the item and calculate an amount for the transaction.

19. The system of claim 14 wherein the object includes information related to at least one of an item, a customer identification, a tender, a transaction and a receipt.

20. The system of claim 14, wherein the plurality of different locations in the stream of commerce comprise at least one point of sale location within the stream of commerce, and wherein the at least one non-point of sale location within the stream of commerce comprises at least one of a back office setting and a warehouse location.

\* \* \* \* \*